United States Patent
Doan et al.

(10) Patent No.: US 8,297,604 B2
(45) Date of Patent: Oct. 30, 2012

(54) QUICK-DISCONNECT WORK SUPPORT ASSEMBLY

(75) Inventors: Paul George Doan, Macomb, MI (US); Brad Holoday, Rochester Hills, MI (US); Michael D. Kelly, Shelby Township, MI (US); Gordon W. Smith, Ortonville, MI (US); James J. Phlypo, Shelby Township, MI (US)

(73) Assignees: Fori Automation, Inc., Shelby Township, MI (US); Chrysler Group LLC, Auburn Hills, MI (US)

( * ) Notice: Subject to any disclaimer, the term of this patent is extended or adjusted under 35 U.S.C. 154(b) by 1560 days.

(21) Appl. No.: 11/625,228

(22) Filed: Jan. 19, 2007

(65) Prior Publication Data

US 2007/0205549 A1    Sep. 6, 2007

Related U.S. Application Data

(60) Provisional application No. 60/760,706, filed on Jan. 20, 2006.

(51) Int. Cl.
   *B23Q 3/08*    (2006.01)
(52) U.S. Cl. ............................................. 269/32; 269/17
(58) Field of Classification Search .................... 269/24, 269/25–27, 32, 17, 900, 904
   See application file for complete search history.

(56) References Cited

U.S. PATENT DOCUMENTS

| 1,718,275 | A |   | 6/1929  | Carter |
|-----------|---|---|---------|--------|
| 2,489,924 | A |   | 11/1949 | Oates |
| 4,723,356 | A |   | 2/1988  | Sakamoto et al. |
| 4,894,908 | A |   | 1/1990  | Haba et al. |
| 4,928,386 | A |   | 5/1990  | Schupp et al. |
| 5,054,668 | A |   | 10/1991 | Ricchiuti |
| 5,303,655 | A |   | 4/1994  | Summa et al. |
| 5,979,267 | A |   | 11/1999 | Yonezawa |
| 6,059,277 | A | * | 5/2000  | Sawdon et al. ................. 269/24 |
| 6,065,743 | A |   | 5/2000  | Roudier et al. |
| 6,109,424 | A |   | 8/2000  | Doan |
| 6,364,302 | B2 | * | 4/2002 | Ausilio ........................... 269/32 |
| 7,017,895 | B2 | * | 3/2006 | Sakamoto ....................... 269/32 |
| 7,584,946 | B2 | * | 9/2009 | Doi ................................. 269/32 |
| 2004/0007440 | A1 |   | 1/2004 | Doan |
| 2005/0225017 | A1 | * | 10/2005 | Sakamoto ....................... 269/32 |
| 2005/0225018 | A1 |   | 10/2005 | Tunkers |
| 2006/0043660 | A1 | * | 3/2006 | Ping ................................. 269/6 |
| 2006/0125166 | A1 | * | 6/2006 | Gerritsen et al. ................. 269/6 |

OTHER PUBLICATIONS

International Search Report for PCT/US07/60797, Oct. 1, 2007, 3 pages.

* cited by examiner

*Primary Examiner* — Lee D Wilson
(74) *Attorney, Agent, or Firm* — Reising Ethington P.C.

(57) ABSTRACT

A plate pin assembly for use with a fixture that holds multiple plate pin assemblies for use in chassis-body marriage during the manufacturing of automobiles. The plate pin assembly has a lower end that fits into a bushing hole on the fixture to attach the plate pin assembly to the fixture, an upper end that supports or otherwise interacts with the vehicle chassis or body, and a quick-disconnect mechanism to enable fast changeover of the plate pin assemblies on the fixture when switching from one vehicle application to another.

24 Claims, 6 Drawing Sheets

QUICK-DISCONNECT WORK SUPPORT ASSEMBLY

CROSS-REFERENCE TO RELATED APPLICATIONS

This application claims the priority of U.S. Provisional Application No. 60/760,706 filed Jan. 20, 2006, the complete disclosure of which is hereby incorporated by reference.

TECHNICAL FIELD

The present invention generally relates to fixtures, such as those carried by Automated Guided Vehicles (AGVs) and used to install various power train, exhaust and other components to the underside of a vehicle during a final assembly process, and more particularly, to plate pin assemblies that can be interchangeably installed in a fixture in order to accommodate a number of different vehicle models.

BACKGROUND OF THE INVENTION

In the manufacturing of automotive vehicles, it is customary to preassemble components and to marry or install them to the vehicle chassis from the underside of the vehicle. Typically, the vehicle chassis is conveyed overhead on a moving conveyer, while the components to be married to the chassis are supported and transported underneath the vehicle chassis by an AGV which rides around in a track or on the floor of the assembly plant. The AGV includes a fixture for supporting the components so that when the components are lined up beneath the vehicle chassis, the fixture and components can be lifted into place and fastened to the chassis. Once the components are secured to the chassis, the empty fixture is lowered back down and the AGV resumes its position at the beginning of the loading and assembly process.

One challenge facing such an assembly process is the large number of vehicle model and feature combinations often produced in the same manufacturing facility. For instance, it is not uncommon for a single vehicle to offer various suspension, engine and transmission packages; each of which requires different fixture locating and nesting features in order to accommodate the different shapes and sizes of the various components. Oftentimes, a fixture will have some type of model-to-model changeover feature which allows a single AGV fixture to be used with a number of different models. One example of such a changeover feature is a flip or pivot down detail, which enables the locating and nesting features to either be manually or automatically rotated in and out of a work position.

Although certain types of fixtures, such as those mentioned above, have been successfully used to accommodate a wide variety of vehicle component combinations, the fixtures with all of their various locating and nesting features can become quite complex and complicated to operate. For instance, many of the locating and nesting features must be flipped in a particular sequence in order to avoid interferences with other details. This is particularly true with more congested fixtures. Furthermore, these types of fixtures are oftentimes not scaleable, in that it is economically and logistically prohibitive to retrofit the fixture to accommodate additional models and feature combinations.

SUMMARY

According to one embodiment, there is provided a work support assembly for use with a work holding fixture. In the work support assembly, a base is adapted to be mounted against the work holding fixture, and a work support member is carried by the base. A quick-disconnect mechanism is also carried by the base and is adapted to couple the work support assembly to the work holding fixture. An actuator is further carried by the base for actuating the quick-disconnect mechanism to disconnect the work support assembly from the work holding fixture.

According to another embodiment, a work holder assembly includes a work holding fixture including a plurality of bushing holes therein, and a plurality of work support assemblies coupled to the work holding fixture. At least two of the plurality of work support assemblies include quick-disconnect mechanisms and locating features that are spaced apart different distances for error proof assembly to the work holding fixture.

According to a further embodiment, an interchangeable plate pin assembly includes a base, a handle carried by the base and including a work support member and a trigger for actuation during installation or removal of the plate pin assembly, and an attachment mechanism operably coupled to the handle. Actuation of the trigger disengages the attachment mechanism so that the assembly can be inserted into or removed from a bushing hole.

According to other embodiments, a fixture, storage tray, and cart are provided to carry the interchangeable plate pin assembly.

BRIEF DESCRIPTION OF THE DRAWINGS

A preferred exemplary embodiment of the invention will hereinafter be described in conjunction with the appended drawings, wherein like designations denote like elements, and wherein.

DETAILED DESCRIPTION OF THE PREFERRED EMBODIMENTS

Figure 1:
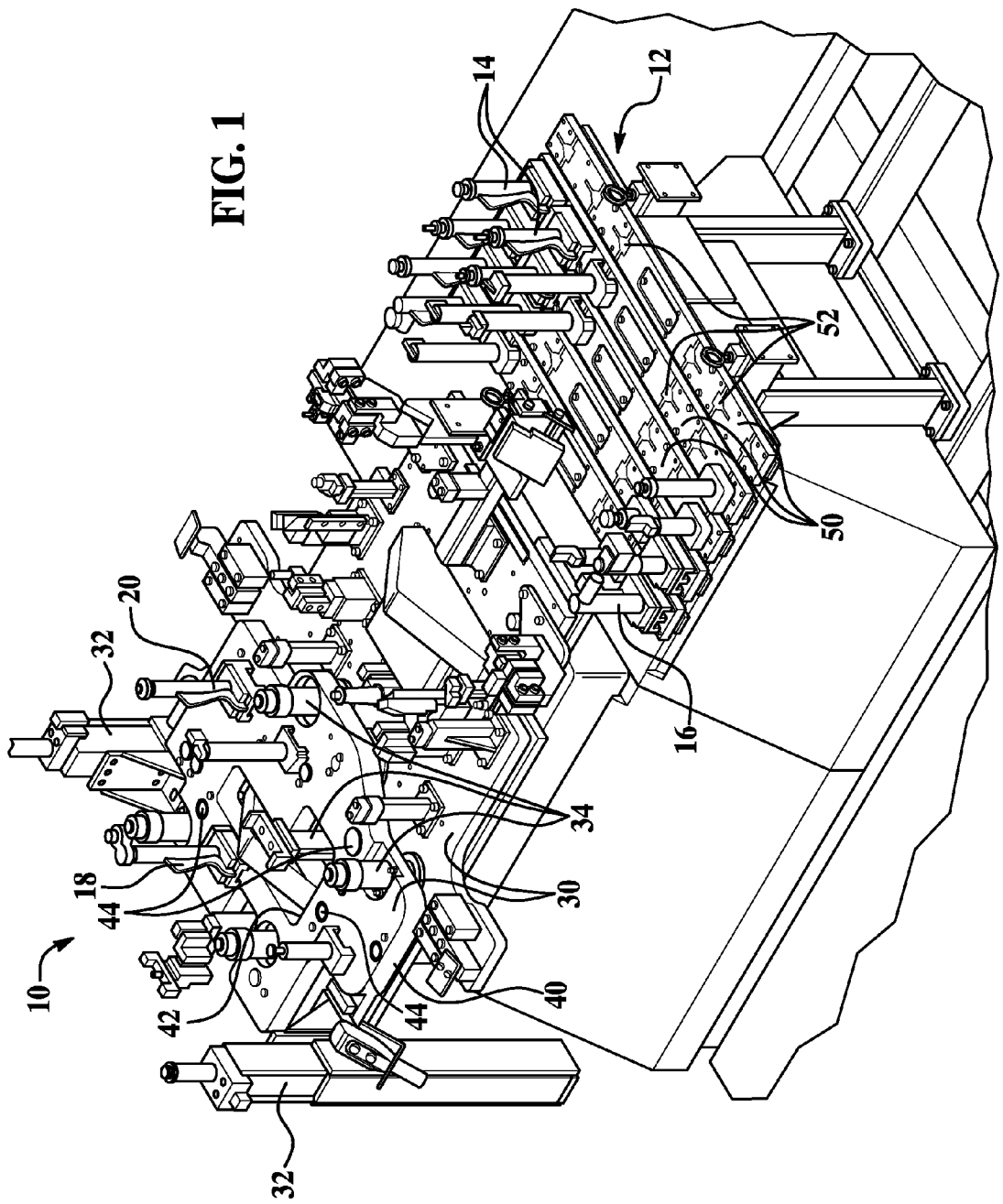
FIG. 1 is a perspective view of an embodiment of a tool fixture, a storage rack and a number of interchangeable plate pin assemblies.

The plate pin assembly described herein is a light-weight, interchangeable device that is designed to be easily installed into and removed from a fixture, such as those found on an Automated Guided Vehicle (AGV), so that a single fixture can accommodate a large number of vehicle component combinations during the assembly process. With reference to FIG. 1, there is shown an example of a tool fixture 10, a storage rack 12, and a number of different interchangeable work support or plate pin assemblies 14-20, some of which are installed in the tool or work holding fixture 10 and some of which are being stored in the storage rack.

Tool fixture 10 is preferably mounted atop an AGV or some other type of cart and is designed to carry one or more vehicle components, such as suspension, engine and transmission components (not shown), so that they may be installed from the underside of a vehicle chassis. In order to properly support and deliver these components to their eventual destination on the vehicle chassis, tool fixture 10 uses a different set of unique locating and/or nesting features for each vehicle model and/or component combination being installed. The locating and/or nesting features may be carried by the plate pin assemblies and can including locating pins, work abutment blocks, or the like. In any case, the fixture 10 and plate pin assemblies 14-20 at least partially define a work holder assembly. According to the embodiment shown here, tool fixture 10 generally includes several horizontal base plates 30, vertical members 32, and a number of permanently installed locations, nesting, installation and other features 34. Because tool fixtures in general are widely known in the art, the following description will primarily focus on those features of fixture 10 that are specific to the interchangeable plate pin assemblies 14-20, and will not include an in-depth recitation of known fixture components.

Base plate 30 is an intricately shaped, generally planar component that is designed to accommodate a wide variety of vehicle component combinations. In addition to a complex periphery 40 and one or more large interior openings 42, base plate 30 includes a series of bushing holes 44 which are strategically located around the base plate 30 and preferably extend through the entire thickness of the plate 30. Bushing holes 44 can be designed such that a single hole accommodates multiple plate pin assemblies, or so that each plate pin assembly has its own separate bushing hole, or other like configurations. In either case, each bushing hole 44 is designed to securely lock one or more corresponding plate pin assemblies 14-20 in place when they are being used, and to release them when they are to be removed and stored.

Storage rack 12 is a storage tray that preferably stores the plate pin assemblies 14-20 in an upright and organized manner when they are not being used by tool fixture 10. According to the embodiment shown here, storage rack 12 is mounted on the same AGV or cart as tool fixture 10, and is a horizontally aligned component that includes a number of individual slats 50. Each slat 50 includes one or more bushing holes 52, which are similar to those of base plate 30, and is designed to receive and store a different set of the plate pin assemblies 14-20. If additional component combinations and/or vehicle models are added, storage rack 12 can easily be retrofitted to accept additional plate pin assemblies by simply adding another slat with appropriately shaped bushing holes. Furthermore, it should be appreciated that storage rack 12 does not necessarily have to be mounted on the same AGV as tool fixture 10. Alternatively, it is possible for storage rack 12 to be mounted on a separate stationary or movable base located in a convenient section of the assembly area, instead of on the mobile AGV, such that it stores plate pin assemblies for one or more tool fixtures, or the storage rack 12 could be mounted in an upright orientation on a wall or other vertical surface, to name but a few of the possibilities. Various types of organizational features, such as color coding the slats 50 to match corresponding colors on the plate pin assemblies, unique errorproof attachment features for each plate pin assembly, and automatic locking features (e.g. using electronic or pneumatic actuators) that only release specific plate pin assemblies in a predetermined sequence, etc. could also be utilized to improve the efficiency of the overall setup. The construction and use of such optional features will be known to those skilled in the art.

Figure 2:
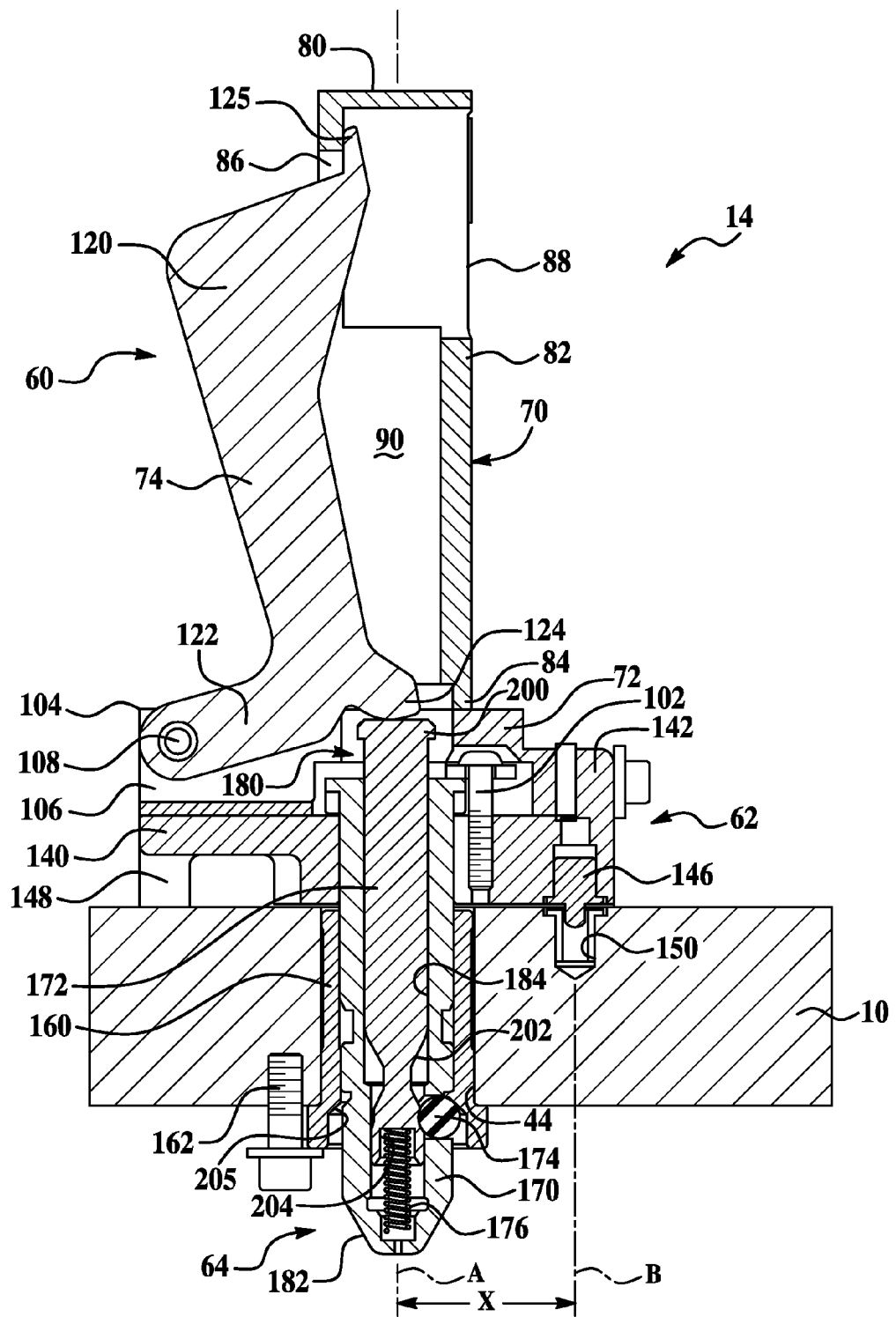
FIG. 2 is a sectional view of an embodiment of an interchangeable plate pin assembly installed in a bushing hole of the storage rack of FIG. 1.
Figure 3:
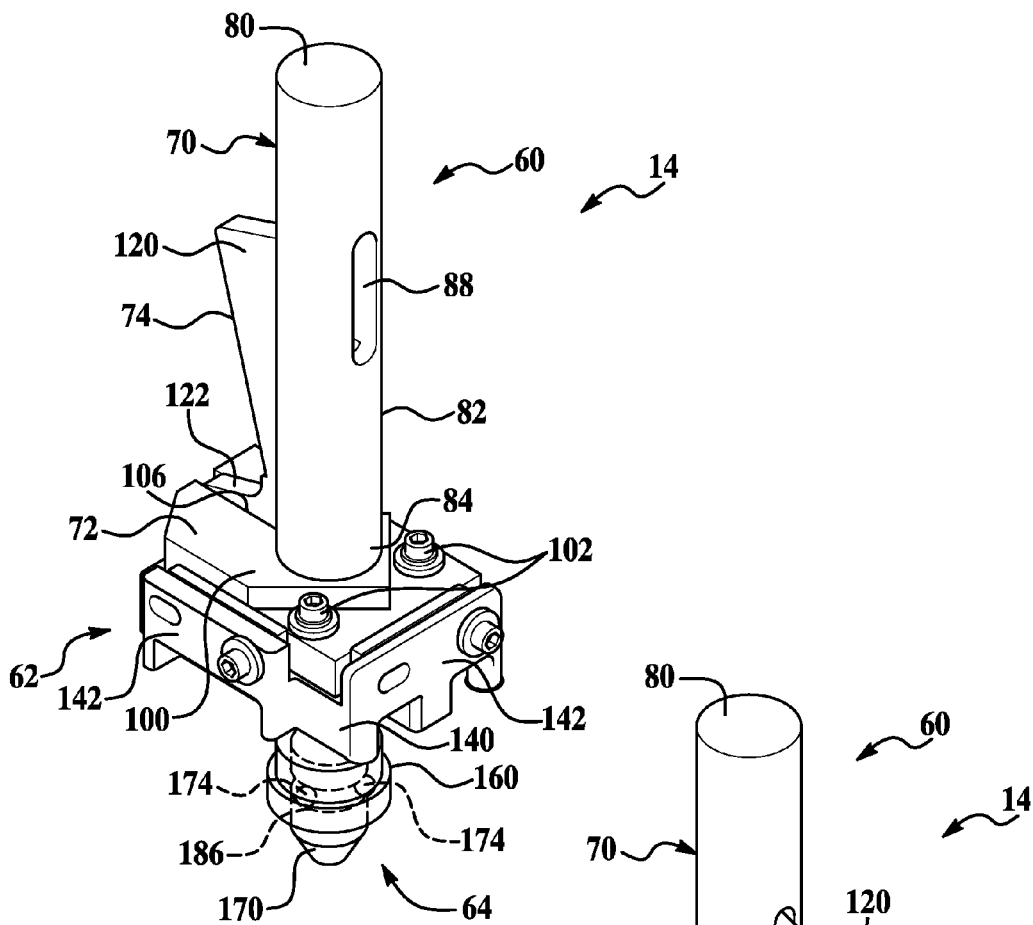
FIGS. 3 and 4 are top perspective views of the interchangeable plate pin assembly of FIG. 2.
Figure 4:
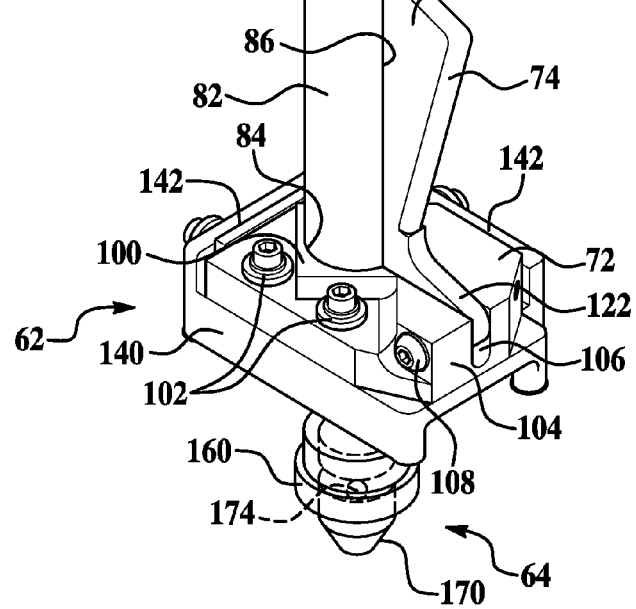

Turning now to FIG. 2, there is shown an embodiment of an interchangeable work support or plate pin assembly 14 installed in a corresponding bushing hole (not shown) of tool fixture 10. The plate pin assembly 14 is a quick-disconnect type of device that can be joined to or separated from a tooling fixture without the use of tools or the like. Thus, "quick-disconnect" means that the mechanism used to allow the plate pin assembly to be released from the bushing hole can be actuated by simple engagement of the plate pin assembly or a part thereof. Thus, for example, the disconnect mechanism can be designed so that a human or robotic operator can simply grasp the plate pin assembly 14 to remove or install it. The plate pin assembly 14 serves as, or supports, a lightweight locator, nesting pin, or the like, for holding any type of work, such as a transmission, engine, exhaust system, or the like. The plate pin assembly 14 includes a quick-disconnect handle-grip for quick installation or removal from a bushing hole on either the tool fixture 10 or the storage rack 12, and generally includes a handle 60, a base 62 and an attachment mechanism 64 adapted to couple the plate pin assembly 14 to the fixture 10, rack 12, or the like. The base 62 carries the handle 60 and the attachment mechanism 64.

Handle 60, which is best seen in FIGS. 2-4 and 7-9, generally serves two primary purposes: first, it can support locators (not shown) or the like that contact the vehicle components being installed, and second, it provides an operator or robot with an engagement mechanism for installing or removing the plate pin assembly 14 from its bushing hole(s). According to the embodiment shown here, handle 60 generally includes a work support member such as a shaft 70, a pedestal 72, and an actuator such as a pivotal trigger 74, all of which are preferably ultimately carried by the base 62.

Shaft 70 is preferably a cylindrical, upright-standing member that is preferably somewhat hollow so that it can pivotally accommodate trigger 74 therein, and generally includes an upper axial end 80 where various work contactors or locators can be mounted which contact the undercarriage component being installed, a cylindrical side surface 82, and a lower axial end 84 for mounting to pedestal 72. Cylindrical side surface 82 includes first and second elongated slots 86, 88 which generally extend in an axial direction and connect with one another via a central cavity 90 located within the shaft 70. The first elongated slot 86 is longer than the second slot 88, as it preferably extends all the way to the lower axial end 84, and is designed to receive trigger 74 so that the trigger 74 may be squeezed by an operator and pivoted into cavity 90. Slot 88, on the other hand, is shorter in axial length and provides access to the interior cavity 90. In the event that trigger 74 becomes stuck or lodged in a compressed state, slot 88 give the operator access to the trigger 74 so that it can be dislodged. In the embodiment shown here, shaft 70 and pedestal 72 form an integral, unitary component, however, it is possible for these two components to be individual pieces.

Pedestal 72 is generally a horizontally aligned, flat component and includes a base 100 for securing shaft 70 in an upright position, various attachment features 102 for threadably connecting the pedestal 74 to base 62, and a pivot block 104. The attachment features 102 shown here are in the form of bolts that screw into threaded holes in the base, however, other types of attachment features known in the art could also be used. The pedestal 72 includes a pivot block 104, which includes a pivot recess 106 in communication with and extending away from elongated slot 86, such that a single L-shaped slot is formed in the handle to pivotally receive trigger 74. As is best appreciated from FIG. 4, pivot block 104 also includes a transverse pivot pin 108 that extends through the block 104, the trigger 74 and the pivot recess 106 and allows the trigger 74 to pivot into and out of shaft 70.

Trigger 74 is preferably a pivotable lever designed to be grasped at an upper end 120 and to pivot about a lower end 122. When squeezed, a contact portion 124 of the trigger 74 drives a plunger 172 of the attachment mechanism 64 down to disengage the attachment mechanism 64. Upper end 120 of the trigger 74 preferably fans out to include a retention tongue or pivot limiting finger 125 which, as best seen in FIG. 2, contacts an inner surface of cavity 90 and thereby generally maintains the trigger 74 within the shaft 70. Lower end 122 of the trigger 74 is preferably formed in the shape of a boot. This configuration contributes to the lever effect of the trigger 74 and makes for easy engagement and operation of handle 60. Contact portion 124 is located near the 'heel' of the boot and includes a blunt, somewhat rounded surface for driving the plunger 172 down in response to engagement of the trigger 74. Because contact portion 124 is somewhat rounded at a back edge, it is able to continuously roll against and smoothly make contact with the plunger 172 all throughout the pivotal travel of the trigger 74.

Figure 5:
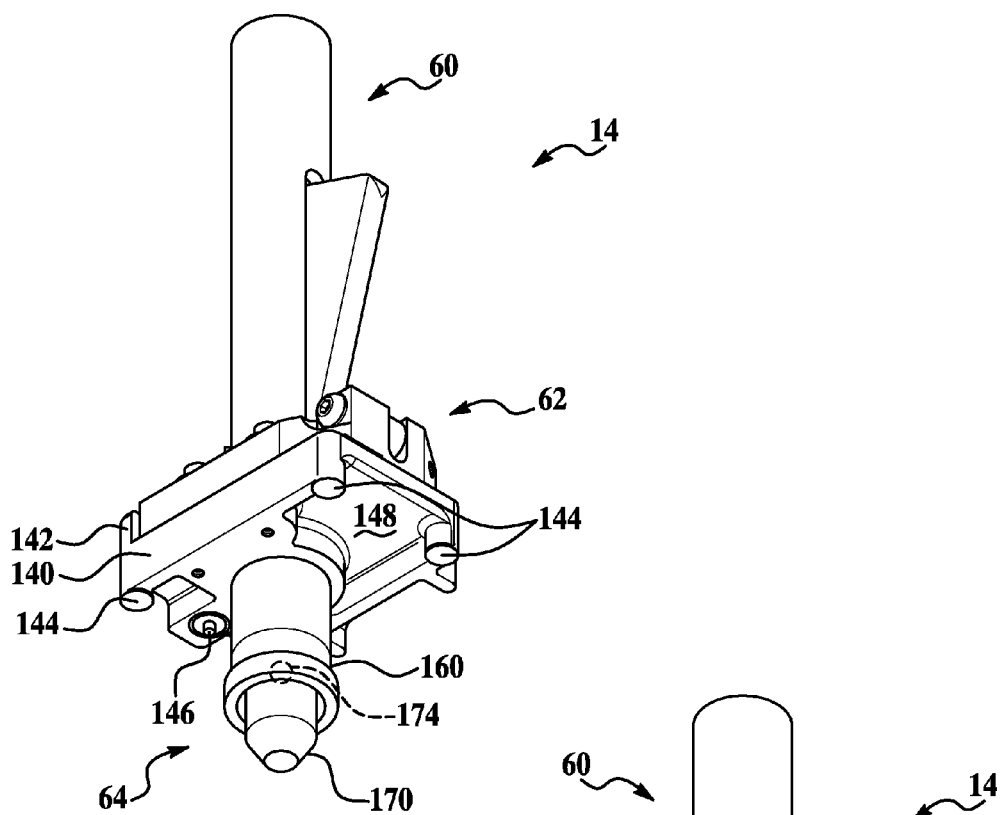
FIGS. 5 and 6 are bottom perspective views of the interchangeable plate pin assembly of FIG. 2.
Figure 6:
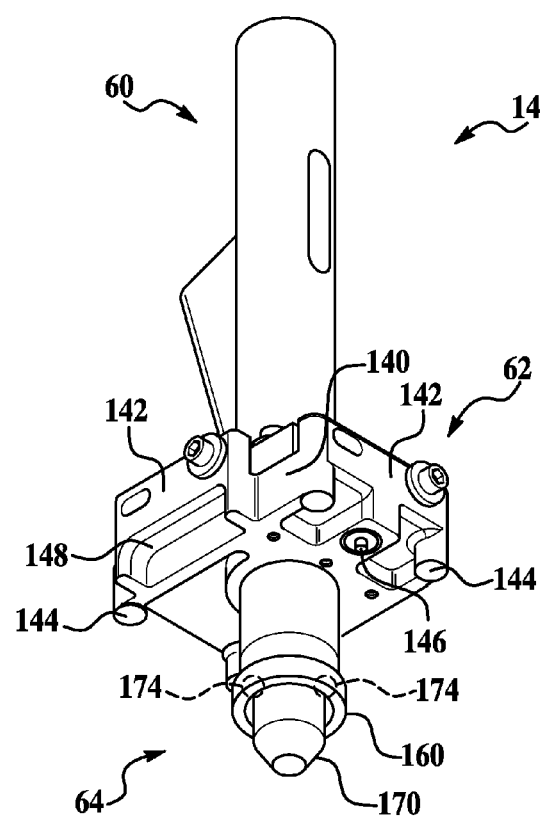
Figure 7:
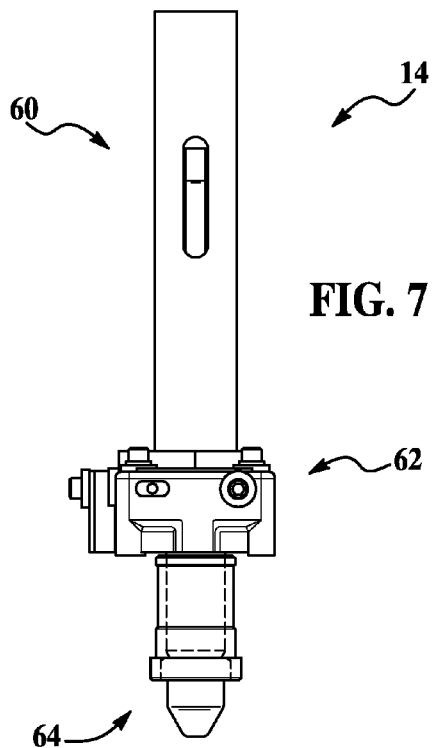
FIGS. 7-9 are side elevational views of the interchangeable plate pin assembly of FIG. 2.
Figure 8:
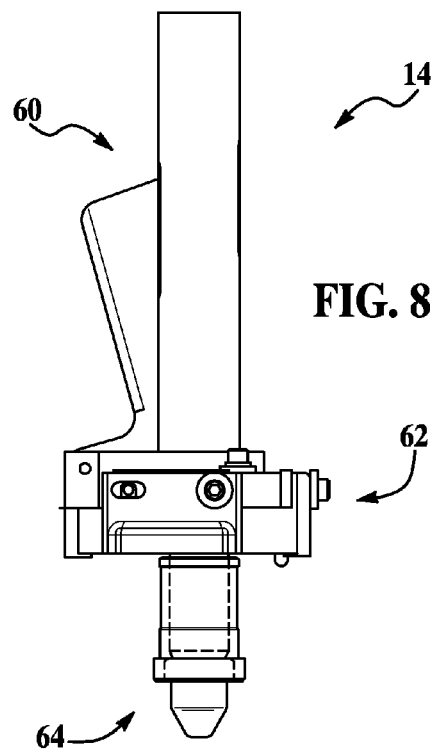
Figure 9:
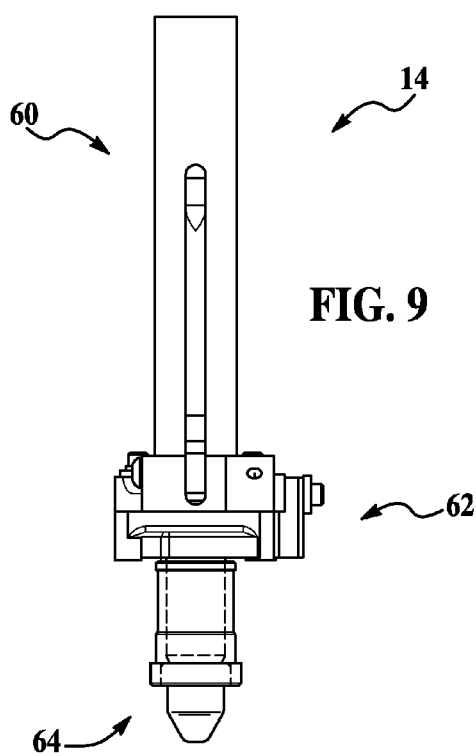
Figure 10:
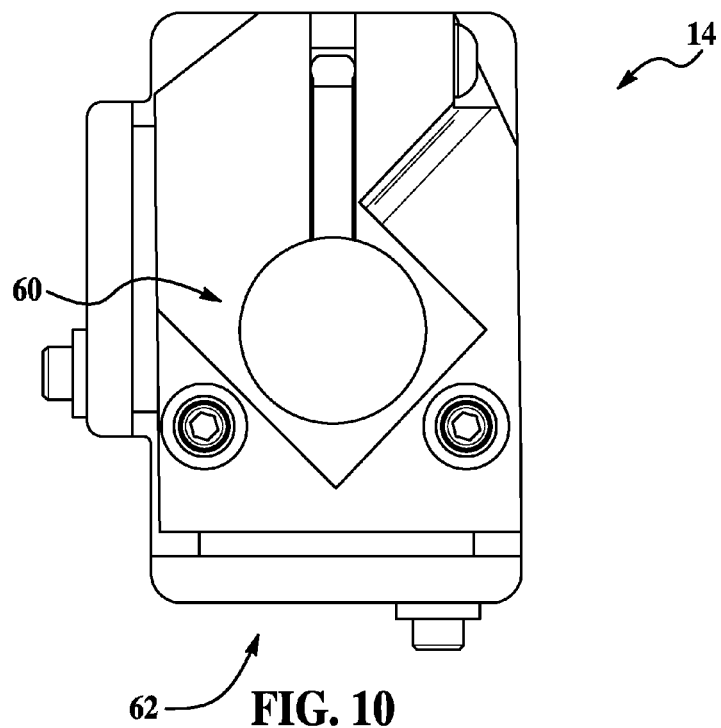
FIG. 10 is a top view of the interchangeable plate pin assembly of FIG. 2.
Figure 11:
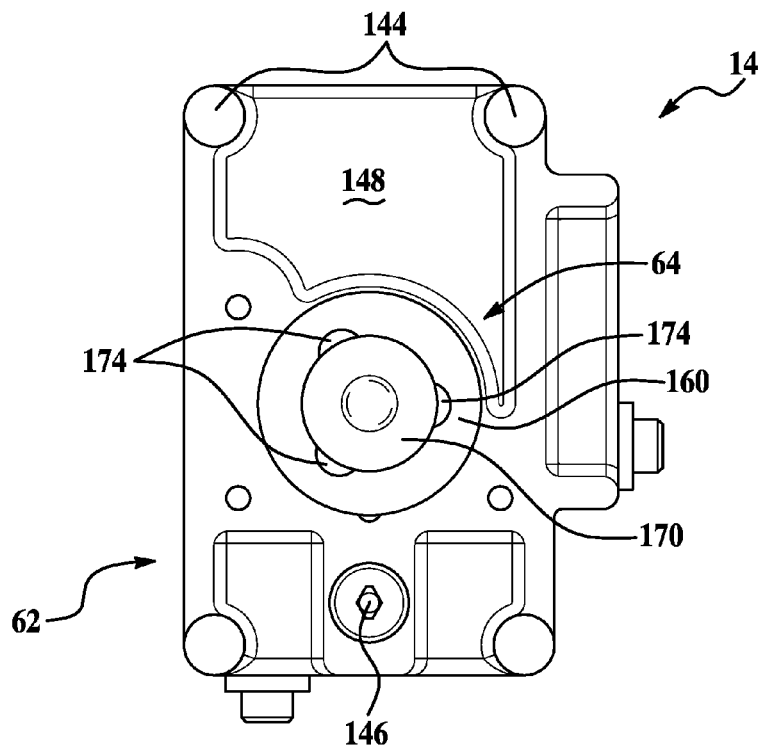
FIG. 11 is a bottom view of the interchangeable plate pin assembly of FIG. 2.

Base 62 securely receives handle 60 and is designed to engage a corresponding surface of either tool fixture 10 or storage rack 12, depending on whether or not the plate pin assembly 14 is being used or being stored. According to the embodiment shown here, base 62 generally includes a horizontal plate 140 and several vertical side walls 142 which together form an integral or unitary component. The upper surface of horizontal plate 140 is shaped to receive the bottom of pedestal 72, while the bottom surface of the horizontal plate (best seen in FIGS. 2, 5 and 6) has four feet 144 designed to rest on an upper surface of the tool fixture 10 or storage rack 12 and includes any suitable locating features such as a locator pin 146, and several receiver bushings or pockets 148. With specific reference to FIG. 2, locator pin 146 has a central axis B which is radially spaced from a central axis A of the plate pin assembly 14 by a certain distance x. The plate pin assembly 14 is designed such that when it is properly inserted into the correct, corresponding bushing hole, locator pin 146 lines up with any suitable locating feature such as a locator hole 150. The plate pin assemblies 14-20 and bushing holes preferably have locator pins 146 and locator holes 150, respectively, which are positioned at unique radial spacings x so that a plate pin assembly cannot be installed into the wrong bushing hole because the locator pin would prevent such an installation. Additional locator features, etc. could be added to the base 62, as is appreciated by those skilled in the art.

Attachment mechanism 64 operably interacts with handle 60 so that plate pin assembly 14 can be installed within and removed from its corresponding fixture bushing hole, which is preferably outfitted with a bushing or sleeve 160 and retention bolt 162. FIGS. 3-11 show the bushing 160 of the fixture 10 carried on the attachment mechanism 64. According to the embodiment shown in FIG. 2, attachment mechanism 64 is a quick-disconnect type of mechanism that generally includes a housing 170, a plunger 172, three ball bearings 174, and a spring 176. The housing 170 is preferably an elongated, cylindrical component that is open at an upper end 180, tapered at a lower end 182, and has an axial bore 184 that generally extends therebetween. Upper end 180 includes an exterior shoulder for attachment to base 62 and is open-ended so that plunger 172 can move in and out of the axial bore 184. The axial bore 184 preferably includes three circular openings 186 spaced around the circumference of the bore. Each of these openings 186 is designed to receive a corresponding ball bearing 174 and provides the ball bearing 174 with enough clearance so that it can be carried by and partially protrude out of the cylindrical housing 170, as will be subsequently explained. Plunger 172 is driven down by the heel or contact portion 124 of the trigger 74 against the force of a resilient member such as a spring 176, and includes a head section 200, a reduced diameter section 202, and a blind hole 204 for receiving the spring 176. The spring 176 biases the plunger 172 into its uppermost position as limited at least in part by engagement of the finger 125 with the inner surface of cavity 90 which limits upward travel of plunger 172 by engagement of its head 200 with heel 124. The head section 200 provides not only a surface for the contact portion 124 to push down on, but it also includes an exterior diameter that is slightly larger than the interior diameter of the axial bore opening so that insertion of the plunger 172 is restricted. The reduced diameter section 202 preferably extends around the entire circumference of plunger 172 and is shaped and sized to receive movable elements such as ball bearings 174 when they are in a radially retracted position. Although three ball bearings are shown here, it is of course possible for the assembly to use more or less bearings than this exemplary embodiment. Spring 176 exerts an upward spring or bias force against plunger 172 and nests within blind hole 204.

During installation of plate pin assembly 14 into bushing hole 44, an operator first squeezes trigger 74 so that the trigger heel or contact portion 124 is pivoted and drives plunger 172 down against the upward force of spring 176. This in turn causes the reduced diameter section 202 to line up with the various ball bearings 174 so that the bearings 174 may radially retract into the axial bore 184. With the ball bearings 174 retracted, plate pin assembly 14 can be inserted into bushing hole 44 without interfering with stationary sleeve 160. As previously mentioned, locator pin 146 has a unique position (radial spacing x) that lines up with a complimentary locator hole 150 so that base 62 can sit flushly atop an upper surface of tool fixture 10. Following insertion of the assembly into the bushing hole, the operator can release trigger 74 which causes an upward movement of plunger 172 and a return of the ball bearings 174 to their radially outward position. This position, which is shown in FIG. 2, allows all three ball bearings 174 to partially protrude out of the circular openings 186 in cylindrical housing 170 so that they can interact with an interior shoulder 205 of sleeve 160 and lock the plate pin assembly 14 in place. It is possible for the plunger 172 to have one or more small indentations on its outer surface in order to facilitate proper seating of the ball bearings 174 in this locking position. In any event, the upward spring force exerted on plunger 172 causes the ball bearings 174 to create a tight, snug fit with shoulder 205 so that no play exists between the components. Once the plate pin assembly 14 is in this locked position, it may be used to install various types of vehicle components and subassemblies to the underside of a vehicle chassis. It should be recognized that a similar installation process is used to install the plate pin assembly 14 into the bushing holes 52 of storage rack 12, and that a reverse removal process is used to remove the plate pin assembly 14.

Furthermore, it should be recognized that while the previous description has been provided in the context of a manually installed and removed plate pin assembly, plate pin assembly 14 could also be installed and/or removed by a robot or some other mechanized device. It is also possible to provide an electronically connected system that coordinates the operations of the AGV, tool fixture 10 and/or storage rack 12. When the system determined that a model changeover was needed, a computer or other electronic processing device would preferably send a signal to tool fixture 10 and storage rack 12 instructing them to release only the plate pin assemblies involved in that particular changeover. For instance, if the tool fixture 10 had six plate pin assemblies installed and a certain model changeover require four of the six assemblies to be changed, then locking mechanisms connected to the four bushing holes 44 involved in the changeover would release their respective plate pin assemblies so that only those assemblies could be removed from the tool fixture 10. A similar process would occur with storage tray 12, where locking mechanisms operably coupled to bushing holes 52 would allow the four old assemblies coming from the tool fixture 10 to be inserted into the storage rack 12 and stored, and would allow the four new assemblies involved in the changeover to be released for installation in the tool fixture 10.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example", "for instance" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A work support assembly for use with a work holding fixture, comprising:
   a base adapted to be mounted against the work holding fixture;
   a work support member carried by the base;
   a quick-disconnect mechanism carried by the base and adapted to couple the work support assembly to the work holding fixture; and
   an actuator carried by the base for actuating the quick-disconnect mechanism to disconnect the work support assembly from the work holding fixture.

2. The work support assembly of claim 1, further comprising a first locating feature carried by the base and adapted to engage a second locating feature of the work holding fixture, wherein the first locating feature is laterally offset from the quick-disconnect mechanism.

3. The work support assembly of claim 1, wherein the actuator is carried by the base by being pivotably mounted to a pedestal, which is fastened to the base.

4. The work support assembly of claim 3, wherein the work support member is carried by the base by being mounted to the pedestal.

5. The work support assembly of claim 4, wherein the work support member is adapted to carry a work contactor thereon.

6. The work support assembly of claim 1, wherein the base includes a passage therethrough and the quick-disconnect mechanism comprises:
   a housing extending through the base passage and being adapted to extend at least partially into the work holding fixture;
   at least one movable element at least partially carried by the housing;
   a plunger extending through the housing for cooperating with the actuator and the at least one movable element; and
   a resilient member to bias the plunger against the actuator and the at least one movable element.

7. A work support assembly for use with a work holding fixture, comprising:
   a base adapted to be mounted against the work holding fixture, wherein the base includes a passage extending therethrough;
   a quick-disconnect mechanism carried by the base and adapted to couple the work support assembly to the work holding fixture, wherein the quick-disconnect mechanism includes:
      a housing extending through the base passage and being adapted to extend at least partially into a bushing hole of the work holding fixture;
      at least one movable element at least partially carried by the housing;
      a plunger extending through the housing for cooperating with the at least one movable element; and
      a resilient member carried between the housing and the plunger;
   a pedestal mounted to the base;
   a substantially hollow work support member mounted to and extending in a longitudinal direction away from the pedestal, and including sidewalls having at least one slot extending longitudinally therethrough; and
   an actuator pivotably mounted to the pedestal and extending through the at least one slot of the work support member for engaging the plunger and actuating the quick-disconnect mechanism to release the work support assembly from the work holding fixture;
   wherein the resilient member biases the plunger against the actuator and the at least one movable element.

8. The work support assembly of claim 7, wherein the work support member is adapted to carry a work contactor.

9. The work support assembly of claim 7, wherein the at least one slot in the work support member includes a first slot into which extends the actuator, and a second slot substantially opposed from the first slot to provide additional access to the actuator.

10. The work support assembly of claim 7, wherein the actuator includes a pivot limiting finger adapted to cooperate with the work support member to limit pivotal movement of the actuator.

11. The work support assembly of claim 7, wherein the base includes at least one receiver pocket for cooperating with the work holding fixture.

12. A work holder assembly including the work support assembly of claim 7, and further including a work holding fixture having at least one bushing hole therein and at least one bushing disposed in the at least one bushing hole, wherein the at least one bushing includes an internal shoulder for cooperation with the at least one movable element of the quick-disconnect mechanism.

13. A work holder assembly, comprising:
   a work holding fixture including a plurality of bushing holes; and
   a plurality of work support assemblies coupled to the plurality of bushing holes of the work holding fixture, wherein at least two of the plurality of work support assemblies include quick-disconnect mechanisms and locating features that are spaced apart different distances for inhibiting incorrect assembly of the work support assemblies to the work holding fixture.

14. The work holder assembly of claim 13, wherein each of the plurality of work support assemblies includes:
- a base adapted to be mounted against the work holding fixture;
- a work support member carried by the base;
- a quick-disconnect mechanism carried by the base and adapted to couple the work support assembly to the work holding fixture, and including a housing extending into a corresponding one of the plurality of bushing holes of the work holding fixture; and
- an actuator carried by the base for actuating the quick-disconnect mechanism to disconnect the work support assembly from the work holding fixture;
- wherein a first work support assembly of the plurality of work support assemblies comprises a first locating feature carried by its base and adapted to engage a first corresponding locating feature of the work holding fixture, wherein the first locating feature is laterally offset from the quick-disconnect mechanism of the first work support assembly by a first distance;
- further wherein a second work support assembly of the plurality of work support assemblies comprises a second locating feature carried by its base and adapted to engage a second corresponding locating feature of the work holding fixture, wherein the second locating feature is laterally offset from the quick-disconnect mechanism of the second work support assembly by a second distance, which is different than the first distance.

15. The work holder assembly of claim 13, wherein the plurality of bushing holes includes bushing holes of different sizes from one another, and least some of the housings of the plurality of work support assemblies are also of different sizes from one another.

16. An interchangeable plate pin assembly, comprising:
- a base;
- a handle carried by the base and including a work support member and a trigger for actuation during installation or removal of the plate pin assembly; and
- an attachment mechanism operably coupled to the handle, wherein actuation of the trigger disengages the attachment mechanism so that the assembly can be inserted into or removed from a bushing hole.

17. The interchangeable plate pin assembly of claim 16, wherein the trigger is pivotable.

18. The interchangeable plate pin assembly of claim 16, wherein the base includes a uniquely positioned locator pin so that the assembly can only be installed into a bushing hole corresponding to the assembly.

19. The interchangeable plate pin assembly of claim 16, wherein the attachment mechanism includes a plunger driven by the trigger and one or more ball bearings driven by the plunger.

20. A fixture for installing components to the underside of a vehicle chassis, comprising a base plate with at least one bushing hole for interchangeably receiving the interchangeable plate pin assembly of claim 16.

21. A storage tray for storing plate pin assemblies, comprising a plurality of slats, each having at least one bushing hole for interchangeably receiving the interchangeable plate pin assembly of claim 16.

22. The storage tray of claim 21 wherein each of the plurality of slats are color coded to correspond to different plate pin assemblies.

23. A cart for use in a chassis marriage application and carrying a fixture including a first plurality of bushing holes, and a storage rack including a second plurality of bushing holes, wherein the first and second pluralities of bushing holes are designed to interchangeably receive a plurality of interchangeable plate pin assemblies each of which is constructed as defined in claim 16.

24. The cart of claim 23, wherein the cart is an Automated Guided Vehicle (AGV).

* * * * *